United States Patent
Noldus

(10) Patent No.: US 11,582,267 B2
(45) Date of Patent: Feb. 14, 2023

(54) METHOD OF AND COMMUNICATIONS HANDLING EQUIPMENT FOR CONTROLLING COMMUNICATION SESSION ESTABLISHMENT IN A MULTIMEDIA COMMUNICATIONS NETWORK

(71) Applicant: Telefonaktiebolaget LM Ericsson (publ), Stockholm (SE)

(72) Inventor: Rogier August Caspar Joseph Noldus, Goirle (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 410 days.

(21) Appl. No.: 15/318,244

(22) PCT Filed: Jul. 25, 2014

(86) PCT No.: PCT/EP2014/066109
§ 371 (c)(1),
(2) Date: Dec. 12, 2016

(87) PCT Pub. No.: WO2016/012057
PCT Pub. Date: Jan. 28, 2016

(65) Prior Publication Data
US 2017/0111404 A1    Apr. 20, 2017

(51) Int. Cl.
*H04L 65/1069*    (2022.01)
*H04L 65/1016*    (2022.01)
(Continued)

(52) U.S. Cl.
CPC ...... *H04L 65/1069* (2013.01); *H04L 61/5007* (2022.05); *H04L 65/1016* (2013.01); *H04L 65/1063* (2013.01); *H04L 65/1104* (2022.05)

(58) Field of Classification Search
None
See application file for complete search history.

(56) References Cited

U.S. PATENT DOCUMENTS 7,110,419 B1 *  9/2006  Linander ................. H04L 61/00
                                                                370/461
9,294,883 B2 *  3/2016  Kneckt .................... H04W 4/06
(Continued)

FOREIGN PATENT DOCUMENTS

EP       1330098 A1     7/2003
WO    2010128916 A1    11/2010

OTHER PUBLICATIONS

Rosenberg et al. "SIP: Session Initiation Protocol" RFC 3261 (Year: 2002).*

(Continued)

*Primary Examiner* — Younes Naji
(74) *Attorney, Agent, or Firm* — Coats & Bennett, PLLC

(57) ABSTRACT

Method, server, network node and multimedia User Equipment, UE, for controlling communication session establishment (10) in a multimedia over Internet Protocol, IP, based communications network with a plurality of multimedia UEs registered in the communications network with a same subscriber. In a communications handling server of the network, in reply to the receipt (12) of a request (11) for establishing a communication session with at least one UE of the plurality of UEs, an adapted request (13) is provided, based on which provisional response(s) and which final response(s) the UE of the plurality of UEs may provide, in response to the request (11) for establishing the communication session. The adapted request is forwarded (14) in the communications network, and a receiving UE processes the adapted request for establishing or not establishing the communication session (15).

12 Claims, 5 Drawing Sheets

(51) Int. Cl.
*H04L 65/1063* (2022.01)
*H04L 61/5007* (2022.01)
*H04L 65/1104* (2022.01)

(56) References Cited

U.S. PATENT DOCUMENTS

| | | | |
|---|---|---|---|
| 2002/0136206 A1* | 9/2002 | Gallant | H04L 65/1104 370/352 |
| 2010/0142517 A1* | 6/2010 | Montemurro | H04W 76/12 370/352 |
| 2011/0161505 A1 | 6/2011 | Siegel et al. | |
| 2014/0068710 A1* | 3/2014 | Lau | H04L 61/5007 370/352 |

OTHER PUBLICATIONS

Rosenberg et al; "SIP: Session Initiation Protocol"; Network Working Group, Request for Comments: 3261, Obsoletes: 2543, Catagory: Standards Track; Jun. 2002, pp. 1-269.

\* cited by examiner

METHOD OF AND COMMUNICATIONS HANDLING EQUIPMENT FOR CONTROLLING COMMUNICATION SESSION ESTABLISHMENT IN A MULTIMEDIA COMMUNICATIONS NETWORK

TECHNICAL FIELD

The present invention generally relates to Internet Protocol, IP, multimedia communications and, more specifically, to controlling communication session establishment of a plurality of multimedia communication devices registered in a multimedia communications network with a same subscriber.

BACKGROUND

Users may avail themselves of multiple multimedia communication devices to satisfy their communication needs. An incoming call or communication session or other form of communication, that is destined for a user, may be offered to one or more of the communication devices, or generally called User Equipment, UE, available to that user. However, the call or communication session is typically accepted on a single device.

Examples of such multimedia communication devices are a mobile phone or smart phone, a tablet Personal Computer, PC, and a laptop PC or desktop PC. Each such device may be used for communication in the broadest sense of the word, however the manner of communication differs, in practice, per device. A mobile phone is typically used for voice calls, messaging and chat. A laptop PC or desktop PC is typically used for chat and for video calls but less likely for voice calls, especially when the user is not behind his/her desk/table etc. A tablet PC may be used for chat, video calls and voice calls. In practice, however, people may rather prefer to use their mobile phone for voice calls.

A related development is that people may be 'reachable' on a shared device, such as a television, TV, screen. While watching TV, an incoming call may be presented in the corner of the TV screen, for example. The TV screen is in this case a 'shared medium'. Whereas the called person is 'reachable', (s)he may not be able or may not be willing to answer the call on the TV. That is, at least not while other persons are watching the TV too. The call is 'presented' on the TV screen, but the called person will prefer to answer the call on his/her mobile phone, for example.

That is, while a person may be 'reachable' on a plurality of devices, i.e. mobile phone, laptop PC, tablet, TV screen, a glasses type device such as Google Glass™, etc. the person may only answer or take the incoming call or communication session on a single one or a subset of the set of communication devices he has availed him/herself of.

The set of devices on which a person may answer an incoming call or other communication session, may depend on the circumstances during which the call is established. For example, generally, an incoming call may be answered on a PC client or on a mobile phone. However, while in a meeting, a call may be permitted to be answered on the mobile phone only, in that a person temporarily leaves the meeting room. However, the alerting of the call or communication session for a user in the meeting may be both on the user's mobile phone, laptop PC, tablet or a central presentation screen or display in the meeting room, for example.

Thus, scenario's that will apply are that a call may in some circumstances be answered only on a particular communication device, such as a dedicated mobile phone, a headset device or other communication device functionally associated with a particular user or subscriber.

Accordingly, with the aforementioned increase in the number of communication devices a person may actually have or may make use of, the landscape of communication devices available to a user at a certain point in time and/or at a certain location, for example, is becoming increasingly heterogeneous and complex. In addition, these different devices will have distinctively different capability. For example, a soft Session Initiation Protocol, SIP, phone installed on a PC for operation in an Internet Protocol, IP, Multimedia Subsystem, IMS, communications network may have different capability than a mobile phone or smart phone.

Certain communication devices may receive an incoming call and alert the user of the device, but the call can't be answered on that device. An example is the common implementation of 'incoming call notification' on a TV screen.

However, from the above it will be appreciated that certain devices do have the intrinsic capability to answer an incoming call/communication session, but circumstances may prohibit a call/communication session to be answered on such device.

When a call or communication session should not be answered on a particular device that does have the capability to answer the call, provided that all conditions for the device and the user for answering the call are satisfied, then the practical solution is to not offer the call to that device. Not offering the call or communication session may, however, pose a problem to both the calling and called subscriber or user, for example in particular in the case of urgent or otherwise important calls.

Offering a call to a device, besides allowing the receiver of that call to answer the call or communication session, may include alerting or notifying the user that a call is arriving and/or inclusion in a device local log, for example. This 'alerting' or 'notifying' may comprise information such as calling party identification, for example calling party name and/or number, call urgency such as low', 'Normal', 'Urgent', call information such as a 'subject', for example 'Meeting invitation', 'Business', 'Private', and so on.

SUMMARY

It is an object to provide a method of and a communication handling server and network node for controlling communication session establishment in a multimedia IP communications network with a plurality of communication devices registered in the network with a same subscriber, for supporting an overall subscriber communication solution comprising a wide set of communication devices of different types or classes.

It is another object to provide a method of and user equipment arranged for operating in such overall subscriber communication solution.

In a first aspect there is provided a method of controlling communication session establishment in a multimedia over Internet Protocol, IP, based communications network towards at least one multimedia User Equipment, UE, of a plurality of multimedia UEs registered, i.e. functionally and/or operatively associated, in the communications network with a same subscriber. In reply to receiving, by a communications handling server of the network, of a request for establishing a communication session with at least one UE of the plurality of UEs, the communications handling server provides an adapted request for establishing the communication session. The adapted request being based on a response, including a provisional and final response, permitted by a UE of the plurality of UEs in reply to the request for establishing the communication session. For actually establishing the communication session, the communications handling server forwards the adapted request in the communications network to the respective UE of the plurality of UEs registered with a same subscriber.

The provision of an adapted request, based on information about which provisional response or responses and which final response or responses one or more UEs of the plurality of UEs that are available to a called subscriber may actually provide or is permitted to provide in reply to a request for establishing a communications session with a calling subscriber, opens the way for integrating an overall communication solution of a subscriber. That is, not only for those communication devices that are strictly associated with or that are personal to that subscriber, such as a mobile phone, but also for devices that are not strictly associated with or that are not personal to that subscriber but that are shared, for example, by a group of persons, such as a TV screen or a conference screen, for example.

Whether the adapted request permits a response, including a provisional and final response, by a UE of the plurality of UEs to establish the communication session, i.e. whether the communication session or call may be answered by a mobile phone or (also) on the TV screen or any other communication device available to the called subscriber, is subject to the information about which UE of the plurality of UEs that are available to a called subscriber may actually establish the communications session, which may depend on a particular point in time, for example.

The adapted request may be forwarded, by the communications handling server, to selected one(s) of the plurality of UEs. However, the communications handling server may also forward an adapted request to each of the UE of the plurality of UEs, which adapted request may be individual, i.e. tailored, to a specific UE. The present solution provides that the request for establishing the communication session received by the communications handling server is forwarded directly, without adaptation, to the one or more UE(s) that may establish the communication session, while an adapted request is forwarded to another UE or to another group of UEs of the plurality of UEs.

The adapted request may be based on communication capabilities by which a UE is registered in the communications network and/or communication information relating to the called subscriber. This communication information is to be conceived to include information relating to one or more of the geographic location of the subscriber, a meeting schedule and/or agenda of the subscriber, availability of the subscriber at particular point in time, and so on.

A conference screen may be registered as a communication device available to a subscriber by virtue of the subscriber being in a video conference using that particular conference screen at a particular date and time, for example. Whether a particular conference screen is applicable to be registered as a UE available to a called subscriber, may be automatically determined from a meeting schedule including that subscriber, the location of the meeting and the communication devices available at that particular location, for example. In the area of Business Communication, BC, such information is available in or retrievable from, for example, Ericsson's Business Communication Enabler, BCE, solution. However, the communication information relating to a subscriber may also be manually provided and made available to the communications handling server.

Registration of a particular UE with a subscriber in the network may be performed manually as well as automatically, for example based on the above-mentioned communication information relating to the called subscriber or BC information.

In particular, the adapted request imposes a restriction on a response or on the permissible response(s) by a UE to the request for establishing a call or communication session. That is, for example, a particular UE, such as a conference screen, alerts and/or logs an incoming session or call for a called subscriber but the response of that UE to the request for establishing a call is restricted in that the UE may not answer the call for that subscriber. Answering of the call may be restricted to the mobile phone of the subscriber, for example. The restriction may be provided in an instruction or indication included in the adapted request.

In another example the adapted request is structured according to the communication capabilities of a particular UE. If the called subscriber is in a car equipped with a hands free communication device, for example, and an incoming call is alerted to both the hands free device and the mobile phone of the subscriber, the latter will be prohibited, i.e. restricted, by the adapted request to respond for actually establishing the call.

Preventing the redirecting of a call by a UE to an alternative destination is another type of restriction in a response that is to be imposed on a UE by an adapted request for establishing a call, in reply to the request for establishing the communication session.

The present method presented provides capability for managing communication establishment towards a user that has a heterogeneous set of communication devices. Specifically, the method presented provides control for determining on which device(s) a user may accept an incoming communication session.

The Internet Protocol, IP, Multimedia Subsystem, IMS, network, being the de facto standard framework for multimedia communication, must become increasingly capable to handle this increasingly complex landscape of communication devices.

The present IMS network is increasingly agile to determine to which one or more of a person's multitude of devices an incoming communication session shall be offered. Session Initiation Protocol, SIP, headers such as Accept-Contact and Reject-Contact, as well as the IMS Communication Service Identifier, ICSI, and the IMS Application Reference Identifier, IARI are used for that purpose.

In an example, wherein the communications network is an IMS based multimedia over IP network, providing the adapted request comprises including a designated SIP header in at least one of a SIP Invite request and a SIP Message request to be forwarded to a UE by a Session Initiation Protocol, SIP, Application Server, AS, operating as communications handling server in the network.

In an example, the SIP AS is arranged to construct and generate the designated SIP header from the information which UE of the plurality of UEs registered to a same subscriber may provide a response for establishing the communication session. This information may be directly available at or retrievable by the SIP AS. However, the designated SIP header for a UE may also be retrieved by the SIP AS from a dedicated or designated server, for example a Business Communication, BC, enabling server, an example of which is the Ericsson's Business Communication Enabler, BCE, solution mentioned earlier.

To ensure proper session establishment, the SIP AS typically provides any of a SIP Invite request and a SIP Message request comprising the designated SIP header only if a SIP User Agent, UA, of a UE supports the designated SIP header.

The designated SIP header to be included in the adapted request for establishing a communication session, typically comprises an instruction or indication imposing a restriction on a response by a UE.

A designated SIP header imposing a restriction on the response by a UE, this designated SIP header, also being termed Disallow-Response header, defines, in an example, which response or responses, including a provisional response or provisional responses and a final response or final responses that not may be returned by a SIP User Agent, UA, of a UE. Responses are indicated by a status code in accordance with the Internet Engineering Task Force, IETF, standard RFC 3261 according to:

| | |
|---|---|
| 100-199 | Provisional response |
| 200-299 | Final response, successful session establishment |
| 300-399 | Final response, call redirection |
| 400-499 | Final response, unsuccessful, subscriber UA not able to accept the session |
| 500-599 | Final response, unsuccessful, system failure |
| 600-699 | Final response, unsuccessful, subscriber not reachable on any UE. |

In a second aspect there is provided a method of controlling communication session establishment in a multimedia UE arranged for operating in a multimedia over IP based communications network. The method, which is performed and controlled by a processor or processing device of the UE, having a memory containing instructions executable by the processor, comprises the steps of:
  receiving a request for establishing a communication session, the request including an instruction or indication based on a response, including a provisional and final response, permitted by the UE in reply to the request,
  processing the instruction or indication included in the request for establishing a communication session, and
  transmitting a response in accordance with the processed instruction or indication included in the request.

In an example, the step of receiving comprises receiving a request including an instruction or indication imposing a restriction on a response by the UE, and the step of processing comprises providing a permissible response in accordance with the restriction implied.

In particular in a UE, comprising a SIP UA, arranged for operating in an IMS based multimedia over IP communications network, the step of receiving a request for establishing a communication session comprises receiving a designated SIP header in at least one of a SIP Invite request and a SIP Message request, which designated SIP header comprises a restriction imposed on a response, including a provisional and final response, to be returned by the SIP UA, of the UE, and the step of processing comprises processing of the request, i.e. the designated SIP header.

In a third aspect there is provided a method of controlling communication session establishment in a multimedia over IP based communications network towards at least one multimedia UE of a plurality of multimedia UEs registered in the communications network with a same subscriber, the method including the steps of:
  receiving, by a communications handling server of the network, a request for establishing a communication session with at least one UE of the plurality of UEs,
  providing, by the communications handling server, in reply to the request for establishing a communication session an adapted request for establishing the communication session, the adapted request being based on a response, including a provisional and final response, permitted by a UE of the plurality of UEs in reply to the request for establishing the communication session,
  forwarding, by the communications handling server, the adapted request in the communications network to the UE,
  receiving, by the UE, the adapted request,
  processing, by the UE, the adapted request, and
  transmitting, by the UE, a response in accordance with the adapted request for establishing the communication session.

In a fourth aspect there is provided a communications handling server for controlling communication session establishment in a multimedia over IP based communications network towards at least one multimedia UE of a plurality of multimedia UEs registered in the communications network with a same subscriber, the server including:
  a receiving unit or receiving module, arranged for receiving a request for establishing a communication session with at least one UE of the plurality of UEs,
  an adapting unit or adapting module, arranged for providing, in reply to the request for establishing a communication session, an adapted request for establishing the communication session, the adapted request being based on a response, including a provisional and final response, permitted by a UE of the plurality of UEs in reply to the request for establishing the communication session, and
  a forwarding unit or forwarding module, arranged for forwarding in the communications network the adapted request for establishing the communication session to the respective UE of the plurality of UEs registered with a same subscriber.

That is, the adapting unit is, arranged for providing, upon receipt of the request, in reply to the request for establishing a communication session an adapted request for establishing the communication session based on which provisional response(s) and which final response(s) the UE of the plurality of UEs may provide, in response to the request for establishing the communication session.

In particular, in an example, the adapting unit of the communications handling server is arranged for providing an adapted request based on at least one of communication capabilities by which a UE is registered in the communications network and communication information relating to the subscriber, as detailed above.

In a fifth aspect, a network node for use in an IMS multimedia communications network includes a communications handling server arranged for operating as a SIP AS in the network, wherein the adapting unit is arranged for providing an adapted request including a designated SIP header in at least one of a SIP Invite request and a SIP Message request to be forwarded to a UE, the designated SIP header comprising an instruction or indication imposing a response, including a provisional response and a final response, by a SIP UA of a UE in reply to the at least one of the SIP Invite request and the SIP Message request.

To enhance efficiency, the adapting unit, in an example, is arranged for providing any of a SIP Invite request and a SIP Message request comprising the designated SIP header only if the SIP UA of a UE supports the designated SIP header and has indicated said support to the SIP AS.

In particular in a business communication environment, the adapting unit is arranged for retrieving the instruction or indication of the designated SIP header for a UE from a designated server, such as a Business Communication, BC, enabling server.

Any or all of the operations to be performed by the receiving unit, adapting unit and forwarding unit in applying the method(s) presented, qualify for implementation in a processor or processing device and a memory of the communications handling server, the memory containing instructions executable by the processor or processing device to control and perform the respective operations.

In a sixth aspect, there is provided a UE arranged for operating in a multimedia over IP based communications network, the UE comprising a communications receiver or receiver module, a transmitter or transmitter module and a processor or processing device or module, having a memory containing instructions executable by the processor for controlling communication session establishment by:

receiving, by the receiver, a request for establishing a communication session, the request including an instruction or indication based on a response, including a provisional and final response, permitted by the UE in reply to the request, processing, by the processor or processing device, the respective instruction or indication included in the request for establishing a communication session, and transmitting, by the transmitter, a response in accordance with the processed instruction or indication included in the request.

In particular for use in an IMS multimedia communications network, the UE includes a SIP UA, arranged for:

receiving a designated SIP header in at least one of a SIP Invite request and a SIP Message request, the designated SIP header including the instruction or indication, processing the designated SIP header, and transmitting a SIP response in accordance with the instruction or indication included in the designated SIP header.

For efficient operation in an IMS network, the SIP UA of a UE, in an example, is arranged for registering, in the network, that this SIP UA supports processing of the designated SIP header. A communications handling server in the network, such as a SIP AS, takes advantage from such a registration in that same may exclude, for example, UEs that are not equipped for handling the designated SIP header, from forwarding an adapted request for establishing a communication session, i.e. a respective designated SIP header.

In a sixth aspect, it is provided that any or all of the steps to be performed by the above-mentioned communications server, network node and UE for applying the method(s) presented are available from a non-transitory computer-readable storage medium, comprising instructions which, when executed on at least one processor of a communications server, network node and/or UE, cause the at least one processor to perform the respective steps. Examples of non-transitory media are memory sticks, flash memory, soft disks, hard disks, etc.

In the context of the present description and claims, a module, device, equipment, or the like may be implemented in a hardware component and/or as a computer program comprising processor executable software instructions.

The above-mentioned and other features and advantages presented will be best understood from the following description and the attached drawings, in particular referring to an IMS communications network with SIP signalling. In the drawings, like reference numerals denote identical parts or parts performing an identical or comparable function or operation.

The method(s) presented is in no manner limited to an IMS network and SIP signalling, but may be applied to any IP communications network employing session control protocols for the set up and shut-down of communication sessions or calls by servers in a control or signalling information exchange.

DETAILED DESCRIPTION

Figure 1:
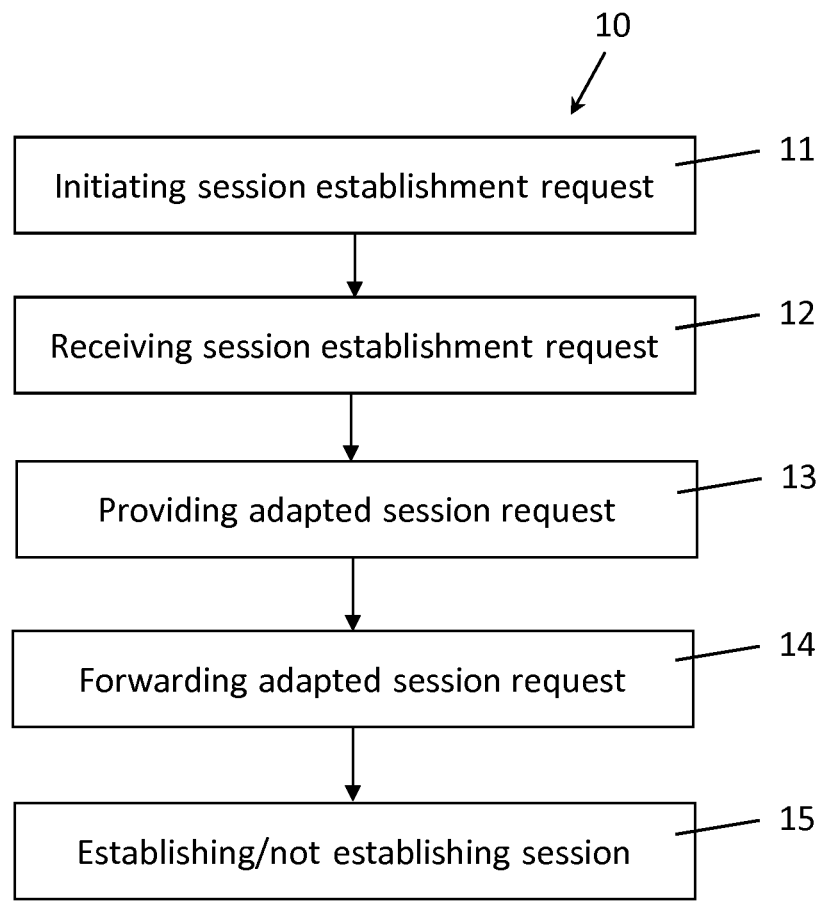
FIG. 1 is a flowchart diagram illustrating an embodiment of the method.

FIG. 1 is a schematic flow chart 10, illustrating a communication session establishment, also termed call establishment, in a multimedia over Internet Protocol, IP, based communications network towards at least one multimedia User Equipment, UE, of a plurality of multimedia UEs registered in the communications network with a same subscriber, i.e. UEs being functionally associated with a same subscriber.

A first user or first subscriber, also referred to as calling party, that would like to set up or establish a communication session with a second user or second subscriber, also referred to as called party, initiates with his/her UE in the network a request for establishing this session, i.e. block 11 "Initiating session establishment request". This request, amongst others, comprises in one way or another data that identify or refer to an identity of the called party in the network.

The request of the calling party is received by a communications handling server in the communications network, for further processing thereof, i.e. block 12 "Receiving session establishment request". This communications handling server may form part of a server of a cluster of servers operative for session establishment in the network, for example.

In reply to the received session request, the communications handling server provides an adapted or modified or otherwise composed request for establishing the requested communication session, based on a response or responses, including provisional response(s) and final response(s), permitted by a UE of the plurality of UEs of the called party identified in the received request in response to the request for establishing the communication session, i.e. block 13 "Providing adapted session request".

The adapted request is forwarded by the communications handling server in the network to a respective UE or UEs registered with the called party, i.e. block 14 "Forwarding adapted session request", and eventually, results in establishment of the requested communication session 15 with a respective UE or UEs of the called party, provided the calling party accepts the session, i.e. block 15 "Establishing/ not establishing session".

By virtue of the adapted or modified request, communication session establishment is effectively controlled by directing which UE of a called party is permitted or allowed to provide a response for actually establishing the requested session or call, i.e. answering the call or communication session.

In an example, the adapted request includes an instruction or indication imposing a restriction on the permissible response(s) by the UE to the adapted request for establishing the communication session. The adapted request, i.e. the restriction, may be based on communication capabilities by which a UE is registered in the communications network and/or communication information to the called subscriber. This communication information is to be conceived to include information relating to one or more of the geographic location of the subscriber, a meeting schedule and/or agenda of the subscriber, availability of the called party subscriber at particular point in time, and so on. The communication capabilities by which a UE is registered in the communications network and/or the communication information related to the called subscriber may be retrieved from one or a plurality of databases and/or servers operating in or connectable to the communications network and accessible to subscribers for entering relevant information, for example.

For each of the UE available or registered with the called party in the communications network, the communications handling server may provide and forward for a UE individually or for a group of UEs an adapted request for establishing the communication session. Whether to forward an adapted request may depend on whether a respective UE is anyhow allowed to provide a response for establishing the communication session.

Those skilled in the art will appreciate that the specific content or instruction or indication of the adapted request depends on specified session or call establishment protocols in a communications network.

Figure 2:
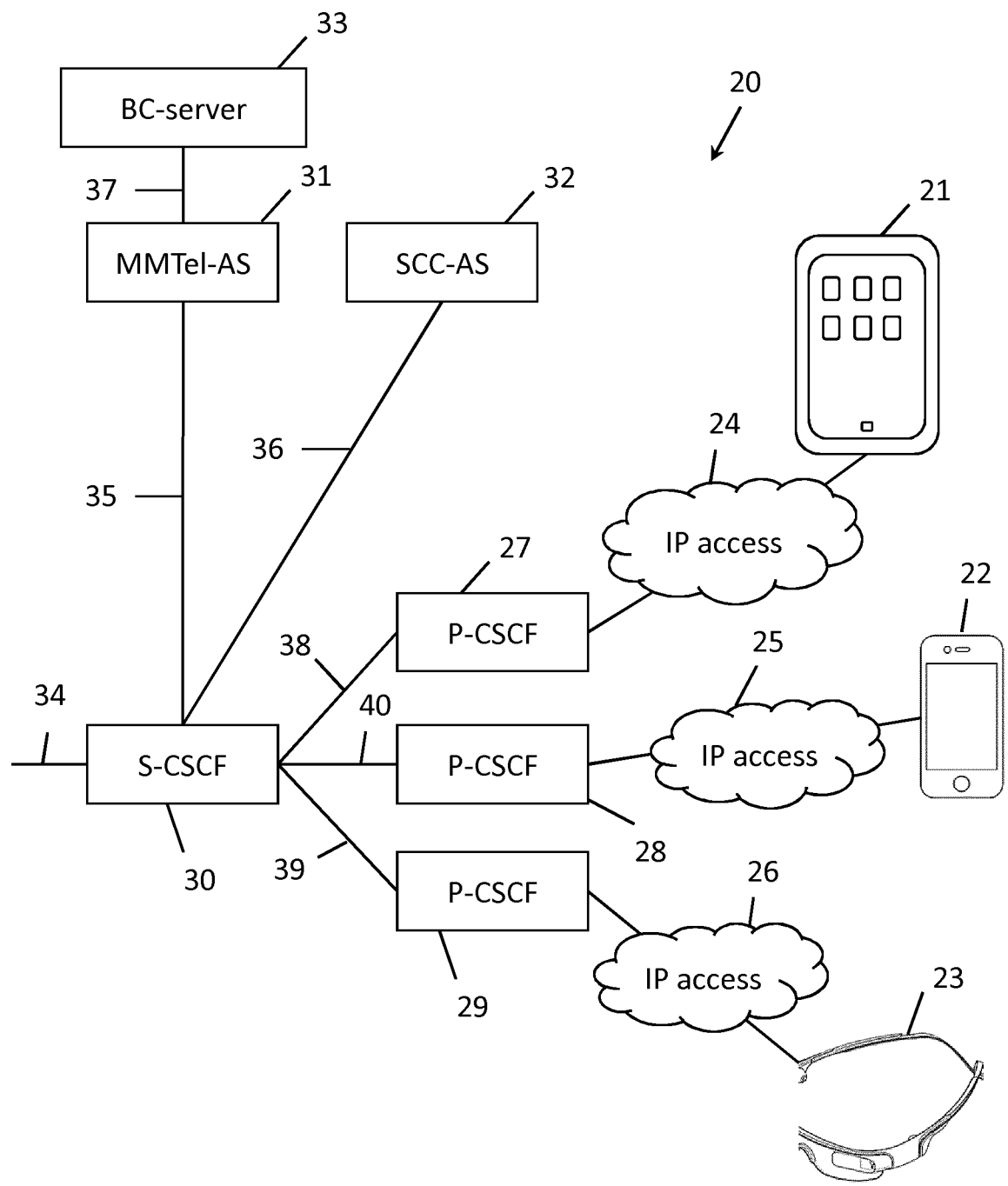
FIG. 2 is a block diagram illustrating an embodiment of an Internet Protocol, IP, Multimedia Subsystem, IMS, network

FIG. 2 provides a visualization of a deployment case in an Internet Protocol (IP) Multimedia Subsystem, IMS, communications network 20. A subscriber is IMS registered with a plurality of UE, such as but not limited to a mobile phone 22, a tablet Personal Computer, PC, 21 and a glasses type device 23. Each UE 21, 22, 23 has the capability to answer a voice call, i.e. a MultiMedia Telephony service, MMteI, call.

A Proxy-Call Session Control Function, P-CSCF, server 27, 28, 29 is a first server in the IMS network communicating with a UE 21, 22, 23, respectively. In the embodiment shown, each UE 21, 22, 23 connects to a particular P-CSCF server 27, 28, 29 by an intermediate IP access network 24, 25, 26, respectively. The IP access networks 24, 25, 26 are, for example, WiFi networks, providing wireless access to a respective P-CSCF 24, 25, 26. Those skilled in the art will appreciate that the some or all of the access networks may be integral or a same network. The P-CSCF 27, 28, 29 serve as a signalling agent between the access network 24, 25, 26 and the remainder of the IMS network 20.

The IMS network 20 further comprises a Serving-Call Session Control Function, S-CSCF, 30 which is a central server in the control or signalling plane 34, 35, 36, 38, 39, 40 of the IMS network 20 and, among others, handles Session Initiation Protocol, SIP, messages and session initiation for establishing a communication session with a UE 21, 22, 23.

The S-CSCF 30 connects to SIP Application Servers, AS, such as an MMTeI-AS 31 and a Service Centralization and Continuity, SCC, AS 32. The latter being responsible for anchoring CS network based voice calls into the IMS network as well as for executing an access network transfer between a packet switched network and a circuit switched network. In the example shown, the MMTeI-AS 31 communicates with a Business Communication, BC, enabling server 33, using Parlay-X technology 37 for call control.

The BC enabling server 33, among others, may provide information relating to one or more of the geographic location of a subscriber, a meeting schedule and/or agenda of the subscriber, type of a meeting, i.e. private or public, number of participants, communication equipment available to a subscriber by virtue of the subscriber being at a particular location, such as a video screen used in a video conference attended a particular time of the day by the subscriber, etc. This information may be retrieved from data entered in the BC enabling server by several users, for example.

Consider the scenario whereby a communication session in the IMS network 20 is established towards a called party or called subscriber with which, in the IMS network 20, multiple UE 21, 22, 23 are registered for communication purposes and in that the MMTeI-AS 31 operates as a communications handling server handling the establishment of a communication session towards one or a plurality of the UE 21, 22, 23 registered with the called party. Further, assume that a communication session establishment may be subject to business communication services provided by the BC enabling server 33.

In this scenario it is the MMTeI-AS 31, whether or not in combination with the BC enabling server 33, i.e. under instruction from the BC enabling server 33, that determines to which UE of the plurality of UE 21, 22, 23 a particular communication session shall be established. Thus, the MMTeI-AS 31, if applicable in combination with BC enabling server 33, determines on which one or more of the UE 21, 22, 23 to which this communication session is offered, the communication session may be answered. This information may be available in or is retrievable by the MMTeI-AS 31 from another network server or network data base and/or the BC enabling server 33, for example.

For example, when a session or call is offered to the PC UE 21 and to the mobile phone UE 22, MMTeI-AS 32 may indicate that the session may be established, i.e. answered on the mobile phone UE 22 only. Another example is that the session is offered to the mobile phone UE 22 and to the glasses UE 23, but MMTeI-AS 31 indicates that the session may be established on the mobile phone UE 22 only. In another scenario, however, it may be the case that the session or call is offered to the mobile phone UE 22 and to the glasses UE 23, and may be answered on any one of these two devices.

There is provided the capability for MMTeI-AS 31, in combination with BC enabling server 33, to offer a communication session to a communication device, but indicate that the session or call may not be answered on that device, i.e. provide an answer-restriction in the offer.

In an example, the manner in which it can be realised that a respective UE is prevented from establishing a session or answering a call, when receiving a communication session invitation, is to include by a SIP AS operating as a communications handling server in the network, i.e. in the assumed scenario the MMTeI-AS 31, a designated SIP header in at least one of a SIP Invite request and a SIP Message request to be forwarded to a respective UE 21, 22, 23.

The term designated SIP header refers to a SIP header designated to the purpose of controlling communication session establishment in accordance with the method(s) presented.

An example of a designated SIP header comprises a restriction on the permissible response(s) by a UE 21, 22, 23. That is to be understood a response that may be returned by a SIP User Agent, UA, of a respective UE 21, 22, 23 on an Invite request, for example. Such designated SIP header, which, in a preferred embodiment, is termed Disallow-Response header, defines at least one of a provisional response and a final response by a SIP User Agent, UA, of a respective UE 21, 22, 23.

It is foreseen that such restriction is part of service logic with the BC enabling server 33, rather than part of service logic in the MMTeI-AS 31. In such a case, BC service logic in the BC enabling server 33 is invoked for a session to a subscriber. The communication capability between MMTeI-AS 31 and BC enabling server 33, such as Parlay-X 37 is, to that purpose, enhanced to facilitate that the BC enabling server 33 may indicate to or inform the MMTeI-AS 31 that, for a certain terminating call offered to the called subscriber, the aforementioned answer-restriction shall apply. However, it is expressly not precluded that this decision, to apply answer-restriction, is applied by MMTeI-AS 31 autonomously.

Figure 3:
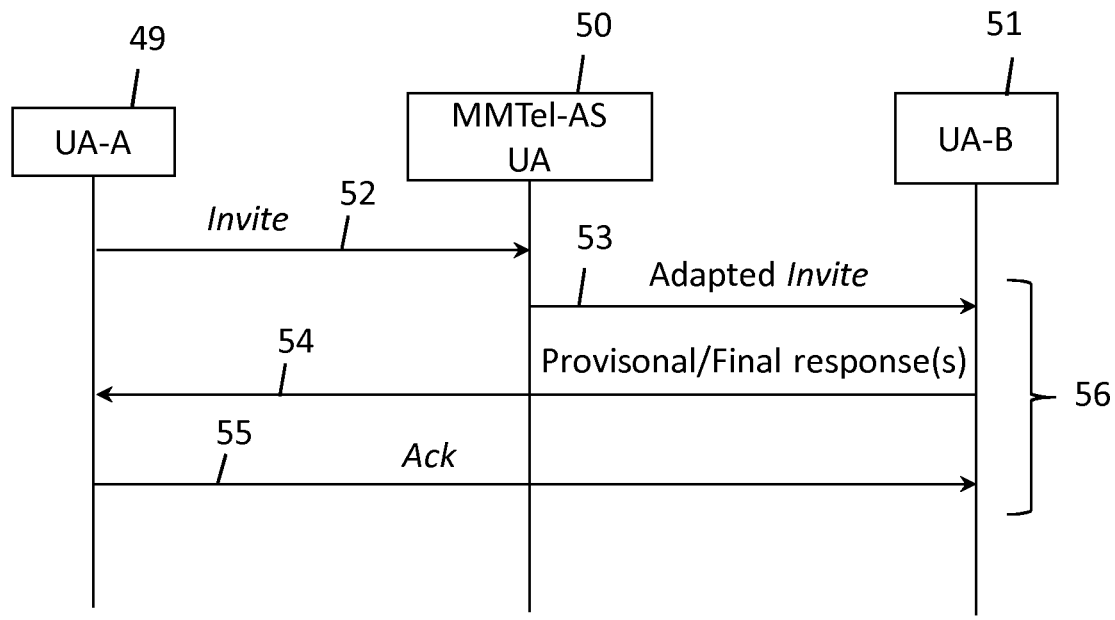
FIGS. 3 and 4 are signalling diagrams illustrating an exchange of signals in an embodiment of an IMS network.

FIG. 3 illustrates a signalling diagram in the IMS control plane of an IMS or IMS enabled network between a SIP User Agent, UA, 50 of the MMTeI-AS 31, a SIP UA of a particular UE 21, 22, 23 registered with a called party or subscriber B, designated UA-B 51, on an Invite request 52 of a calling party or subscriber A, provided by its SIP UA designated UA-A 49, indicating a request to establish a communication session with the called party B. It is noted that subscriber A may be any of the UE 21, 22, 23, for example. In the signalling diagram shown, time is assumed to run from the top to the bottom of the drawing.

In accordance with an example, in reply to the Invite request 52, UA 50 of the MMTeI-AS 31 provides an adapted or modified Invite request 53 and forwards same via the IMS network to a UA-B 51. Although not explicitly shown in FIG. 3, the adapted Invite request 53 is forwarded to UA-B 51 via S-CSCF 30 and any of the P-CSCF 27, 28, 29 shown in FIG. 2, dependent on which UE of the UE 21, 22, 23 is the intended receiver of the adapted Invite request 53.

Adapting the received Invite request 52 may comprise including in a designated SIP header in at least one of a SIP Invite request and a SIP Message request to be forwarded to a UE 21, 22, 23 a restriction indication or a restriction instruction relating to one or a plurality of SIP responses, including one or more provisional responses and/or one or more final responses, based on or related to the permissible response(s) by a UE 21, 22, 23, for example.

A UE, i.e. the SIP UA thereof, is supposed to provide a response to a session establishment request. The UE may provide one or more provisional responses and must provide a final response to UA-A 49, through or via UA 50, as illustrated by reference numeral 54 in FIG. 3. The final response gives the final outcome of the request: successful (session establishment request accepted) or unsuccessful (session establishment request is not accepted).

SIP responses that, in principal, may be returned by the SIP UA-B 51 are designated by a status code in accordance with the Internet Engineering Task Force, IETF, standard RFC 3261, selected from:

| | |
|---|---|
| 100-199 | Provisional response |
| 200-299 | Final response, successful session establishment |
| 300-399 | Final response, call redirection |
| 400-499 | Final response, unsuccessful, subscriber UA not able to accept the session |
| 500-599 | Final response, unsuccessful, system failure |
| 600-699 | Final response, unsuccessful, subscriber not reachable on any UE. |

Thus, consider the case that a server like MMTeI-AS 31, based on the received Invite request 52, under instruction of BC enabling server 33, determines that the session should not be established on the tablet PC UE 21 registered with the called subscriber B, but on the mobile phone UE 22, even though all conditions for the UE 21 to accept the call are fulfilled, in the current circumstances, the session may be answered on the mobile phone UE 22 only.

This is achieved, in the present example, by not allowing the UE 21 to respond with a 200 Ok message, i.e. by not allowing the UE 21 to indicate that the session is established.

Instead, the response by the UE 21 should be restricted to one the following (xx denotes any number between 00-99 inclusive):

- (optional) one or more provisional response(s), followed by 4xx,
- (optional) one or more provisional response(s), followed by 5xx—the returning of 5xx should in any case occur only in erroneous cases,
- (optional) one or more provisional response(s), followed by 6xx—the called party would in this case decline the entire call, through action on the UE 21,
- (optional) one or more provisional response(s), followed by a Cancel message from the network, then followed by 487 from the UE 21; this is the case that the call is answered on an another device or the calling party has abandoned the call setup. A final response in the 3xx range might be allowed in this case. The UE 21 may redirect the call to a different destination.

For example, 181 may not be allowed; the UE 21 should not forward the SIP request. In the basic deployment case, the SIP-AS, i.e. the communications handling server, in the network would just want to disallow the UE 21 to send a 2xx final response. To this end, a dedicated SIP header is introduced hereto, called 'Disallow-Response', as illustrated in the example adapted SIP Invite request 53 below:

INVITE sip:+31161249911@mnc234.mcc123.3gppnetwork.org; user=phone

Route: . . .

Accept-Contact: . . .

Reject-Contact: . . .

. . .

Disallow-Response: 200

This represents the Invite request 53 sent from a SIP-AS, such as MMTeI-AS 31, to S-CSCF 30 for establishing a session to UE 21 of the called party B. The R-URI (Request Uniform Resource Identifier) is still the called party's Multimedia Public Identity, IMPU, from the Invite request 52 received by the UA 50 from UA-A 49; it is not replaced by a contact address. The Disallow-Response: 200 indicates that the UE 21 is not allowed to respond with a 200 Ok Final response 54. A Final response 54 received by the UA 50, i.e. UA-A 49, is acknowledged by Ack 55, terminating the session establishment as being unsuccessful 56 on the UE 21.

Other examples include:

Disallow-Response: 200, 305, 308=Final response 200, 305 and 308 are disallowed.

Disallow-Response: 200, 300-399=Final response 200 and final responses in the range 300-399 are disallowed.

Disallow-Response: 181, 200-299, 300-399=Final response 181, final responses in the range 200-299 and final response in the range 300-399 are disallowed.

SIP proxies/servers in between the SIP-AS and the UA, such as S-CSCF 30, SCC-AS 32 and P-CSCF 27, 28, 29, do not act on the Disallow-Response SIP header. Only the receiving SIP UA-B 51 acts on this SIP header.

Figure 4:
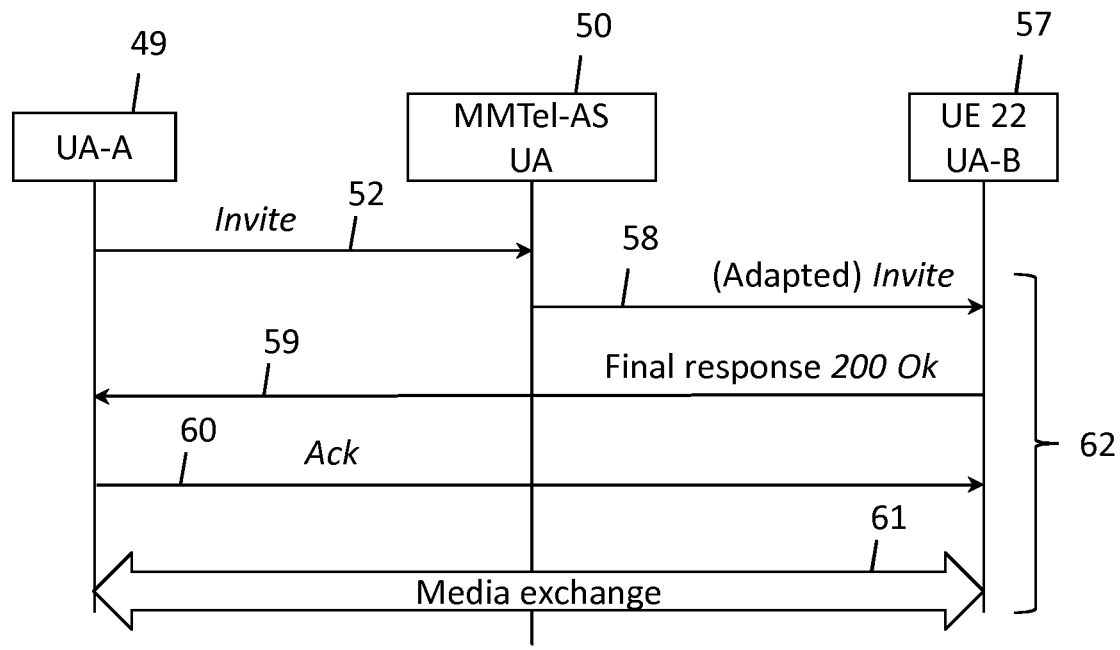

As illustrated in the signalling diagram of FIG. 4, in case of a mobile phone UE 22, having a SIP UA 57, the Invite request 52 is adapted if required but may also be forwarded as received whenever it has been determined by the MMTeI-AS 31 that the UE 22 is allowed to establish a requested communication session as usual, i.e. may respond with a 200 Ok Final response 59, acknowledged by Ack 60 and resulting in a successful 62 media exchange communication session 61. However, the Invite request 52 in FIG. 4 may likewise be adapted by including a designated SIP Header in an adapted Invite request 58, to impose a particular restriction on the response by the UE 22.

For compatibility, the SIP-AS server operating as the communications handling server should be aware whether the addressed UA of a UE 21, 22, 23 supports a designated SIP header, such as a Disallow-Response SIP header. Hereto, a tag is proposed for the Supported SIP header. When a UE 21, 22, 23 registers in the IMS network 20, the UE indicates its supported capability. Hence, a SIP UA that registers with the IMS network indicates that it supports a designated SIP header, like the example SIP exchange below:

REGISTER sip:ims-operator.se SIP/2.0

. . .

Supported: response-restriction

The SIP Register request received by the S-CSCF 30, and the 200 Ok returned by the S-CSCF, are included in the SIP Register request sent to the SCC-AS 32 and the MMTeI-AS 31, as per existing third party registration functionality. Rationale for this is that SCC-AS 32 and MMTeI-AS 31 need to be aware of the registered contact address, since that information will be used in, among others, the MMteI service logic processing. With this mechanism, the MMTeI-AS 31 is made aware of the support in the UE 21, 22, 23 of the restricted response feature. MMTeI-AS 31 may hence include the Disallow-Response SIP header only in the case that the respective UE 21, 22, 23 has explicitly indicated that it supports this SIP header.

It is noted that a Disallow-response: 200 designated SIP header does not necessarily imply that the request for establishing a session is not alerted or displayed or otherwise indicated on the UE 21. As described in the summary part above, the session request may be alerted on a respective UE, such that the adapted Invite request 53 towards the UE 21 tablet PC, as well as an adapted Invite request towards the glasses UE 23 containing the designated SIP header Disallow-Response: 200 do not necessarily prohibit the SIP UA in the UE 21 and the UE 23 from sending a 180 Ringing message.

Figure 5:
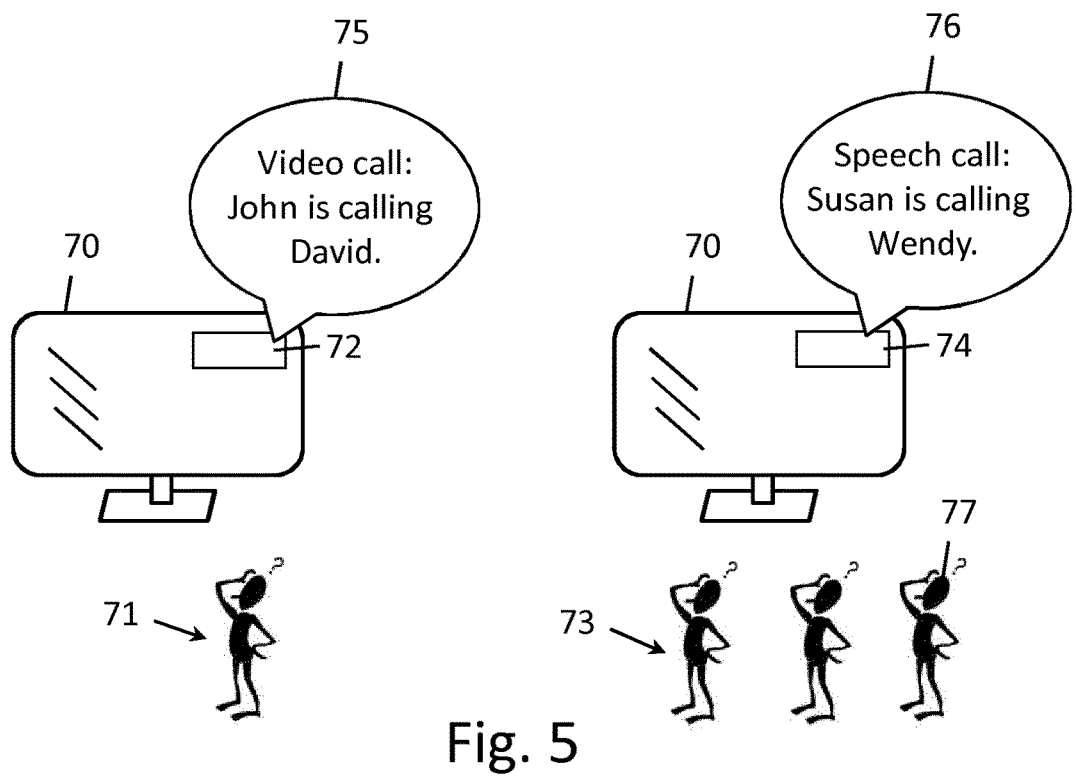
FIG. 5 is a diagram of an embodiment of a deployment in an IMS network.

FIG. 5 illustrates a deployment case whereby an incoming call is offered on the TV screen or a conference screen 70 comprising communication capabilities including audio, video and speech communication, for example. Hereto, the user(s) 71, 73 is/are registered as IMS subscriber(s) in SIP UA instances operational in a TV system/conference system to which the screen 70 operatively connects or forms part of.

With reference to FIG. 2, the screen 70 may operatively connect via an IP access network 24, 25, 26 to a P-CSCF 27, 28, 29.

The registration as IMS user, for showing an incoming call on the screen, for example, may form an optional ('opt-in') part of signing up as participant in this conference or may be automatically performed, based on communication information relating to a subscriber, such as is determined from a meeting schedule including that subscriber, the location of the meeting and the communication devices available at that particular location, for example. Such information being available, for example, in the BC enabling server 33 shown in FIG. 2. Thus, registration of a particular UE 21, 22, 23 with a subscriber in the network may be performed manually as well as automatically, for example based on the above-mentioned communication information relating to the called subscriber or business communication information.

In the left hand part of FIG. 5, a single subscriber 71 is registered as IMS user on the TV screen 70. A call that is offered to that TV screen 70 may also be answered on the TV screen 70 when the subscriber is in a private environment, such as at home, for example. Assume an incoming video call or session is displayed 72 at the upper right hand side of the screen 70: "Video call: John is calling David", i.e. text balloon 75. David 71 may answer the call on the screen 70, for example by using the TV remote control. However, David 71 may also decide to take the call at his mobile phone UE 22, for example. In this scenario, there may be a need to forward an adapted Invite 58 to the screen 70 or the mobile phone UE 22, for the purpose of making routing of the call available to the screen 70, for example.

In the right hand part of FIG. 5, multiple subscribers 73 are registered as IMS subscriber on the screen 70. A call that is offered to that screen, for a single participant, may not be answered on the conference system, but is to be established by the mobile phone of that participant. Assume an incoming speech call or session is displayed 74 at the upper right hand side of the screen 70: "Speech call: Susan is calling Wendy", i.e. text balloon 76. As multiple persons 73 are watching the screen 70, MMTeI-AS 31, in cooperation with BS enabling server 33, for example, has decided that Wendy 77 may not answer the speech call on the screen 70, such that the screen 70 is disallowed to establish a session between Susan and Wendy. However, Wendy 77 is allowed to establish the session by her mobile phone UE 22 exclusively, for example.

That is, in this scenario, the session may be answered by Wendy 77 on her mobile phone UE 22, but not on the tablet PC UE 21 and not on the glasses UE 23. Accordingly an adapted Invite request 55 forwarded towards the tablet PC UE 21 as well as an adapted Invite request 55 towards the glasses UE 23 contains the SIP header Disallow-Response: 200. The SIP UA 51 in the tablet PC UE 21 may, however, not prohibited from sending 180 Ringing, while that may be the case for the SIP UA 51 built in the glasses UE 23. Thus, different adapted Invite requests are forwarded to each of the UE 21 and 23, while the received Invite 52 may directly be forwarded to the SIP UA 57 of the mobile phone UE 22.

In the above, adaptation of a SIP Invite request is described. However, a SIP Message request in the IMS control plane may likewise be modified by the inclusion of a designated SIP header and forwarded as and adapted request.

Figure 6:
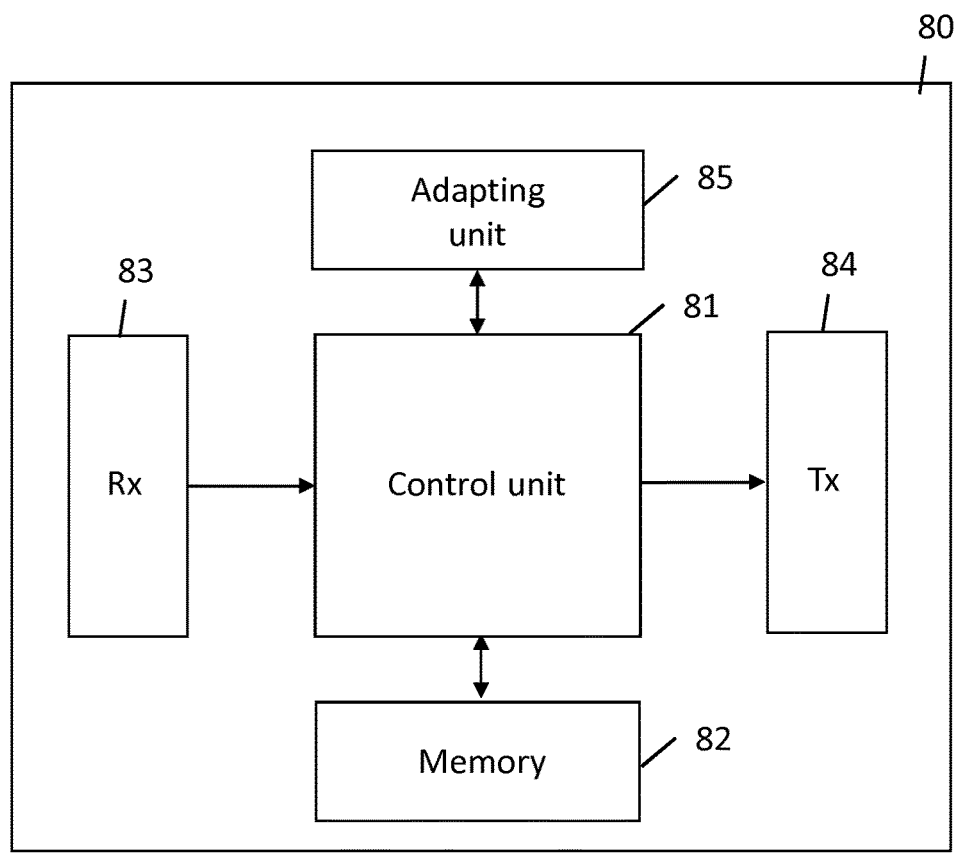
FIG. 6 is a block diagram of an embodiment of a communications handling server.

FIG. 6 is a schematic example of architecture of a communications handling server 80 for use in an IP communications network, such as an application server AS 31, 32 in an IMS network 20.

The server 80 comprises a memory 81, an IP network input and output unit, i.e. receiving unit Rx 83 and forwarding or transmitting unit Tx 84, having an input and output for receiving and forwarding or sending signalling messages and communication data, and an adapting unit 85, all connected to and controlled by a communication processing and control unit 81, comprising a processor or comprising processing equipment arranged for establishing a signalling path for a communication session between a calling party and a called party in an IP based communications network. For operating in an IMS network, the control unit 81 performs the functions of a SIP UA, such as SIP UA 50 disclosed with reference to FIGS. 3 and 4.

The adapting unit 85 is arranged for providing, upon receipt of a request for establishing a call or session, an adapted request for establishing that communication session. The adapted request may be generated or constructed from information which UE of the plurality of UEs registered to a same subscriber may provide a response for establishing the communication session. This information may be directly available at or retrievable by the server 80. However, the adapted request may also be retrieved from a dedicated server, for example a Business Communication, BC, enabling server, operative in or with the IP network.

Part or all functionality of the units 83, 84, 85 may be implemented and performed by dedicated hardware components and/or as software instructions executable by a processor or by processing equipment of the control unit 81, for example.

Figure 7:
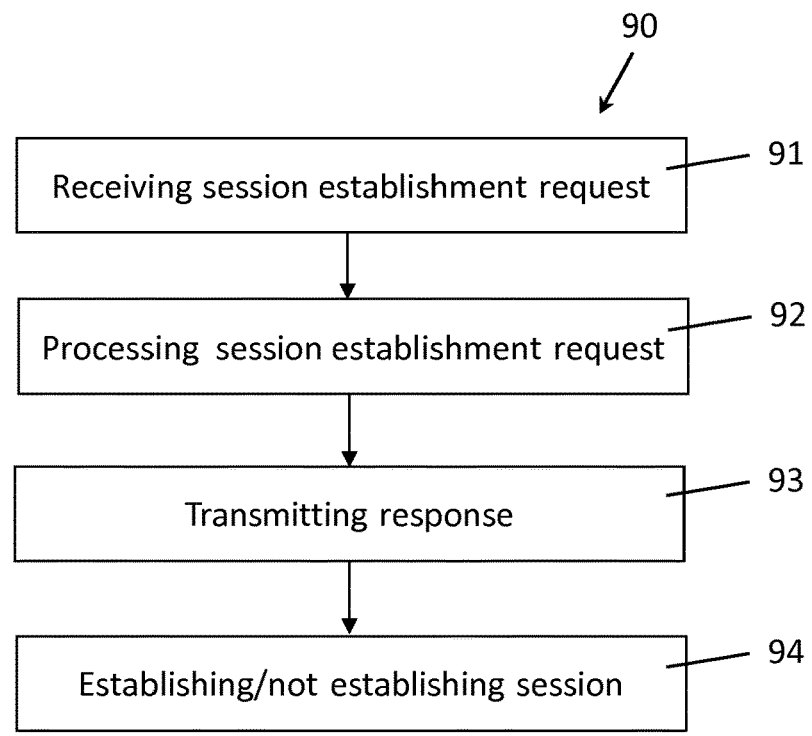
FIG. 7 is a flowchart diagram illustrating an embodiment of the method.

FIG. 7 is a schematic flow chart 90, illustrating controlling communication session establishment, also termed call establishment, in a multimedia User Equipment, UE, arranged for operating in a multimedia over Internet Protocol, IP, based communications network.

A UE, such as any of the UE 21, 22, 23, 70 described above, when receiving a request for establishing a communication session, i.e. block 91 "Receiving session establishment request", including an instruction or indication imposing a restriction how to respond by this UE to the request, processes the instruction, i.e. block 92 "Processing session establishment request", and transmits or forwards a response in accordance with the instruction(s) included in the request, i.e. block 93 "Transmitting response". Dependent on the instruction, the call or session may or may not be established on that UE, i.e. block 94 "Establishing/not establishing session".

In the case that the UE 21, 22, 23, 70 is arranged for operating in an IMS based multimedia over IP communications network, in an example, receiving a session establishment request comprises receiving a designated SIP header in at least one of a SIP Invite request and a SIP Message request, which designated SIP header includes the instruction or indication imposing a restriction on the response by the UE. Processing the session establishment request comprises processing of the designated SIP header.

Figure 8:
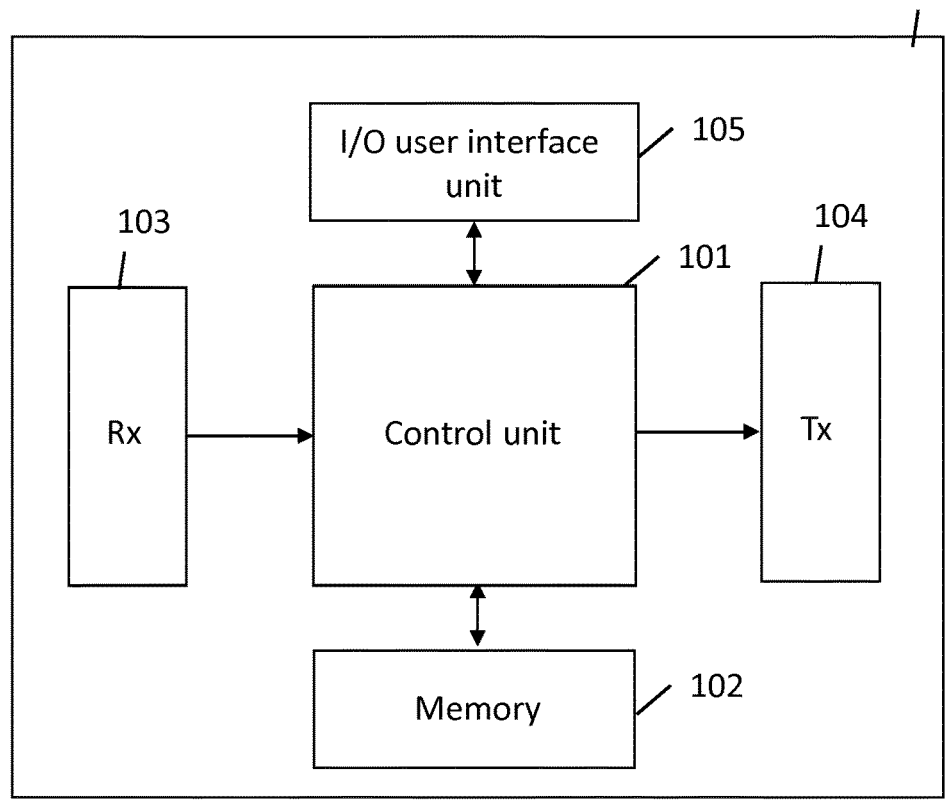
FIG. 8 is a block diagram of an embodiment of a User Equipment, UE.

FIG. 8 is a schematic example of architecture of a multimedia User Equipment, UE, for operating in an IP communications network, such as a UE 21, 22, 23, 70 arranged for operating in an IMS network.

The UE 21, 22, 23, 70 comprises a memory 102, an IP network input and output unit, i.e. receiving unit or module Rx 103 and forwarding or transmitting unit or module Tx 104, having an input and output for receiving and forwarding or sending signalling messages and communication data, and an I/O user interface unit or module 105, all connected to and controlled by a communication processing and control unit or module 101, comprising a processor or comprising processing equipment or module arranged for establishing a signalling path for a communication session between the UE 21, 22, 23, 70 and another UE in an IP based communications network. For operating in an IMS network, the control unit or module 101 performs the functions of a SIP UA, such as SIP UA 51, 57 disclosed with reference to FIGS. 3 and 4.

The I/O user interface unit or module 105 may comprise multiple interface devices, like a microphone and loudspeaker, a display, touch screen, keyboard, and the like providing a user of the UE 21, 22, 23, 70 a multimedia communication experience, as will be appreciated by those skilled in the art.

Registration of the UE 21, 22, 23, 70 with a subscriber in the network may be performed by the control unit or module 101 manually as well as automatically, for example based on the above-mentioned communication information relating to the called subscriber or BC information. Registration may involve capabilities of the UE 21, 22, 23, 70 and whether the UE 21, 22, 23, 70 is able to process adapted requests, such as designated headers.

The provision of an adapted request for establishing a communications session or call with a calling subscriber as disclosed and presented above, opens the way for integrating an overall communication solution of a subscriber. That is, comprising communication devices that are personal to that subscriber, such as a mobile phone, and communication devices that are not personal to that subscriber but that are shared, for example, by a group of persons. A request for establishing a session may be alerted on a respective UE, while this UE or another UE registered, i.e. functionally associated with a particular subscriber may actually establish, i.e. take the session or call. The adapted request may automatically be based on communication capabilities by which a UE is registered in the communications network and/or communication information relating to the called subscriber including information relating to one or more of the geographic location of the subscriber, a meeting schedule and/or agenda of the subscriber, availability of the subscriber at particular point in time or day.

Part or all functionality of the units or modules 103, 104, 105 may be implemented and performed by dedicated hardware components and/or as software instructions executable by a processor or by processing equipment of the control unit or module 101, for example.

The invention is not limited to the embodiments described, but can be practiced with modification and alteration within the spirit and scope of the appended claims.

The invention claimed is:

1. A method of controlling communication session establishment in an Internet Protocol (IP) Multimedia Subsystem (IMS) based communications network between a first multimedia User Equipment (UE) registered in the communications network with a first subscriber and a second multimedia User Equipment (UE) registered in the communications network with a second subscriber, the second multimedia UE comprising one of a plurality of second multimedia UEs registered in the communications network with the second subscriber, the method comprising:

receiving, by a communications handling server that is configured to operate as a Session Initiation Protocol (SIP)Application Server (SIP AS) in the communications network and from the first multimedia UE, a SIP request comprising one of a SIP Invite request and a SIP Message request for establishing a communication session with at least one second multimedia UE of the plurality of second multimedia UEs;

providing, by the communications handling server and responsive to the SIP request, an adapted SIP request comprising an adapted SIP Invite request or an adapted SIP Message request for establishing the communication session, wherein:

the adapted SIP request includes a designated SIP header comprising a restriction imposed on a response permitted by the at least one second multimedia UE in reply to the SIP request for establishing the communication session; and the restriction comprises an instruction imposing the response, including a provisional response and a final response, by a SIP User Agent (UA) of the at least one second multimedia UE in reply to the one of the SIP Invite request and the SIP Message request, and forwarding the adapted SIP request, by the communications handling server and in the communications network to the at least one second multimedia UE.

2. The method of claim 1, wherein, for each of the plurality of second multimedia UEs, the communications handling server provides and forwards an adapted SIP request for establishing the communication session.

3. The method of claim 1, wherein the adapted SIP request is based on at least one of communication capabilities by which a corresponding second multimedia UE is registered in the communications network and communication information relating to the second subscriber.

4. The method of claim 1, wherein the providing the adapted SIP request by the SIP AS comprises retrieving, by the SIP AS, the designated SIP header from a designated server.

5. The method of claim 1, wherein the providing, by the SIP AS, the designated SIP header in the one of the SIP Invite request and the SIP Message request comprises the SIP AS providing the designated SIP header only if a SIP User Agent (UA) of a corresponding second multimedia UE supports the designated SIP header and has indicated the support to the SIP AS.

6. The method of claim 1, wherein the designated SIP header imposes a restriction on a response that a corresponding second multimedia UE is not permitted to provide in reply to receipt of the designated SIP header, the response for the corresponding second multimedia UE indicated by a status code selected from:

100-199 Provisional response 200-299 Final response, successful session establishment 300-399 Final response, call redirection 400-499 Final response, unsuccessful, subscriber UA not able to accept the session 500-599 Final response, unsuccessful, system failure 600-699 Final response, unsuccessful, subscriber not reachable on any UE.

7. A method of controlling communication session establishment between a first multimedia User Equipment (UE) and a second multimedia User Equipment (UE) configured to operate in an Internet Protocol (IP) Multimedia Subsystem (IMS) based communications network, the first multimedia UE being registered in the communications network with a first subscriber and the second multimedia UE being one of a plurality of second multimedia UEs registered in the communications network with a second subscriber, the method comprising:

receiving, by the second multimedia UE, an adapted Session Initiation Protocol (SIP) request comprising one of an adapted SIP Invite request and an adapted SIP Message request for establishing a communication session with the first multimedia UE, wherein:

the adapted SIP request includes a designated SIP header comprising a restriction imposed on a response permitted by the second multimedia UE in reply to the adapted SIP request for establishing the communication session; and the restriction comprises an instruction imposing the response, including a provisional and final response;

processing, by the second multimedia UE, the instruction included in the designated SIP header of the adapted SIP request; and transmitting, by the second multimedia UE, the response in accordance with the processed instruction included in the designated SIP header of the adapted SIP request.

8. A communications handling server for controlling communication session establishment in Internet Protocol (IP) Multimedia Subsystem (IMS) based communications network between a first multimedia User Equipment (UE) registered in the communications network with a first subscriber and a second multimedia User Equipment (UE) registered in the communications network with a second subscriber, the second multimedia UE comprising one of a plurality of second multimedia UEs registered in the communications network with the second subscriber, the communications handling server comprising:

processing circuitry;

memory containing instructions executable by the processing circuitry whereby the communications handling server is configured to operate as a Session Initiation Protocol (SIP) Application Server (AS) in the communications network and is operable to:

receive, from the first multimedia UE, a SIP request comprising one of a SIP Invite request and a SIP Message request for establishing a communication session with at least one second multimedia UE of the plurality of UEs;

provide, responsive to the SIP request, an adapted SIP request comprising an adapted SIP Invite request or an adapted SIP Message request for establishing the communication session, wherein:

the adapted SIP request includes a designated SIP header comprising a restriction imposed on a response permitted by the at least one second multimedia UE in reply to the adapted SIP request for establishing the communication session, and the restriction comprises an instruction imposing the response, including a provisional response and a final response, by a SIP User Agent (UA) of the at least one second multimedia UE in reply to the one of the SIP Invite request and the SIP Message request; and forward the adapted SIP request in the communications network to the at least one second multimedia UE.

9. The communications handling server of claim 8, wherein the instructions are such that the SIP AS is configured to retrieve the instruction of the designated SIP header for a second multimedia UE from a designated server.

10. The communications handling server of claim 8, wherein the instructions are such that the SIP AS is configured to provide the SIP Invite request or the SIP Message request only if the SIP UA of the at least one second multimedia UE supports the designated SIP header and has indicated the support to the SIP AS.

11. A second multimedia User Equipment (UE) configured to establish a communication session with a first multimedia UE over an Internet Protocol (IP) Multimedia Subsystem (IMS) based communications network, the first multimedia UE being registered in the communications network with a first subscriber and the second multimedia UE comprising one of a plurality of second multimedia UEs registered in the communications network with a second subscriber, the second multimedia UE comprising:

processing circuitry;

memory containing instructions executable by the processing circuitry whereby the second multimedia UE is operable to control communication session establishment by:

receiving, from the first multimedia UE, a Session Initiation Protocol (SIP) request comprising one of an adapted SIP Invite request or an adapted SIP Message request for establishing a communication session, wherein:

the SIP request includes a designated SIP header comprising a restriction imposed on a response permitted by the second multimedia UE in reply to the SIP request for establishing the communication session; and the restriction comprises an instruction imposing the response, including a provisional and final response;

processing the instruction included in the designated SIP header of the adapted SIP request; and transmitting the response in accordance with the processed instruction included in the designated SIP header of the adapted SIP request.

12. The second multimedia UE of claim 11, wherein the instructions are such that the second multimedia UE is configured to register, in the communications network, that the second multimedia UE supports processing of the designated SIP header.

* * * * *

UNITED STATES PATENT AND TRADEMARK OFFICE
CERTIFICATE OF CORRECTION

PATENT NO. : 11,582,267 B2
APPLICATION NO. : 15/318244
DATED : February 14, 2023
INVENTOR(S) : Rogier August Caspar Joseph Noldus It is certified that error appears in the above-identified patent and that said Letters Patent is hereby corrected as shown below:

In the Specification

In Column 2, Line 40, delete "as low'," and insert -- as 'Low', --, therefor.

In Column 9, Line 47, delete "MMTeI," and insert -- MMTel, --, therefor.

In Column 10, Line 2, delete "MMTeI-AS" and insert -- MMTel-AS --, therefor.

In Column 10, Line 7, delete "MMTeI-AS" and insert -- MMTel-AS --, therefor.

In Column 10, Line 25, delete "MMTeI-AS" and insert -- MMTel-AS --, therefor.

In Column 10, Line 32, delete "MMTeI-AS" and insert -- MMTel-AS --, therefor.

In Column 10, Line 37, delete "MMTeI-AS" and insert -- MMTel-AS --, therefor.

In Column 10, Line 42, delete "MMTeI-AS" and insert -- MMTel-AS --, therefor.

In Column 10, Line 45, delete "MMTeI-AS" and insert -- MMTel-AS --, therefor.

In Column 10, Line 49, delete "MMTeI-AS" and insert -- MMTel-AS --, therefor.

In Column 10, Line 55, delete "MMTeI-AS" and insert -- MMTel-AS --, therefor.

In Column 10, Line 65, delete "MMTeI-AS" and insert -- MMTel-AS --, therefor.

In Column 11, Line 17, delete "MMTeI-AS" and insert -- MMTel-AS --, therefor.

In Column 11, Lines 19-20, delete "MMTeI-AS" and insert -- MMTel-AS --, therefor.

Signed and Sealed this
Fourth Day of July, 2023

Katherine Kelly Vidal
*Director of the United States Patent and Trademark Office*

CERTIFICATE OF CORRECTION (continued)
U.S. Pat. No. 11,582,267 B2

In Column 11, Line 22, delete "MMTeI-AS" and insert -- MMTel-AS --, therefor.

In Column 11, Line 26, delete "MMTeI-AS" and insert -- MMTel-AS --, therefor.

In Column 11, Line 30, delete "MMTeI-AS" and insert -- MMTel-AS --, therefor.

In Column 11, Line 41, delete "MMTeI-AS" and insert -- MMTel-AS --, therefor.

In Column 12, Line 10, delete "MMTeI-AS" and insert -- MMTel-AS --, therefor.

In Column 12, Line 57, delete "MMTeI-AS" and insert -- MMTel-AS --, therefor.

In Column 13, Lines 16-17, delete "MMTeI-AS" and insert -- MMTel-AS --, therefor.

In Column 13, Line 39, delete "MMTeI-AS" and insert -- MMTel-AS --, therefor.

In Column 13, Line 41, delete "MMTeI-AS" and insert -- MMTel-AS --, therefor.

In Column 13, Line 43, delete "MMteI" and insert -- MMTel --, therefor.

In Column 13, Lines 44-45, delete "MMTeI-AS" and insert -- MMTel-AS --, therefor.

In Column 13, Line 46, delete "MMTeI-AS" and insert -- MMTel-AS --, therefor.

In Column 14, Line 43, delete "MMTeI-AS" and insert -- MMTel-AS --, therefor.

In Column 14, Line 66, delete "as and" and insert -- as an --, therefor.

In the Claims

In Column 16, Lines 65-66, in Claim 1, delete "Session Initiation Protocol (SIP)Application Server (SIP AS)" and insert -- Session Initiation Protocol (SIP) Application Server (AS), (SIP AS) --, therefor.

In Column 18, Lines 35-36, in Claim 8, delete "Session Initiation Protocol (SIP) Application Server (AS)" and insert -- Session Initiation Protocol (SIP) Application Server (AS), (SIP AS) --, therefor.